United States Patent [19]

Thorborg

[11] 4,334,265

[45] Jun. 8, 1982

[54] THYRISTOR INVERTER WITH INVERTER BRIDGE AND COMMON TURN-OFF CIRCUIT FOR INVERTER THYRISTORS

[75] Inventor: Kjeld Thorborg, Vesteras, Sweden

[73] Assignee: ASEA Aktiebolag, Vesteras, Sweden

[21] Appl. No.: 186,802

[22] Filed: Sep. 12, 1980

[30] Foreign Application Priority Data

Jan. 19, 1979 [SE] Sweden ................................ 7900490

[51] Int. Cl.³ .......................................... H02M 7/515
[52] U.S. Cl. ...................................... 363/72; 363/138
[58] Field of Search ............. 363/37, 43, 72, 135–137, 363/138; 318/801, 810, 811

[56] References Cited

U.S. PATENT DOCUMENTS

| | | | |
|---|---|---|---|
| 3,366,867 | 1/1968 | Dodge | 363/135 |
| 3,538,419 | 11/1970 | Seki et al. | 363/138 |
| 3,638,094 | 1/1972 | Ve Nard | 363/72 |
| 3,694,727 | 9/1972 | Seki | 363/138 |
| 3,786,326 | 1/1974 | Hubner | 318/138 |

FOREIGN PATENT DOCUMENTS

| | | |
|---|---|---|
| 2747449 | 4/1978 | Fed. Rep. of Germany . |
| 2657718 | 6/1978 | Fed. Rep. of Germany . |
| 54-735 | 1/1979 | Japan ........................................ 363/37 |
| 203654 | 4/1966 | Sweden . |
| 549314 | 1/1978 | Switzerland . |

OTHER PUBLICATIONS

Pesc '80 Record. , IEEE, Pwr. Electronics Specialists Conference, Atlanta, Ga., USA, 16-20 Jun. 1980, pp. 374–384.

Primary Examiner—William H. Beha, Jr.
Attorney, Agent, or Firm—Pollock, Vande Sande & Priddy

[57] ABSTRACT

An inverter connection has an inverter bridge which, in series with a controllable valve, is connected between terminals for connection to a direct voltage source. A turn-off circuit is arranged for simultaneous turn off of the thyristors of the inverter. The turn-off circuit comprises a capacitor connection and a thyristor connection which is controllable in both directions. The latter is connected, in series with at least one capacitor, between a point which is located between the valve and the bridge, and at least one of the terminals. An inductor is arranged in at least two of the three current paths between said point and the terminals.

6 Claims, 6 Drawing Figures

THYRISTOR INVERTER WITH INVERTER BRIDGE AND COMMON TURN-OFF CIRCUIT FOR INVERTER THYRISTORS

DESCRIPTION

TECHNICAL FIELD AND BACKGROUND ART

The present invention relates to an inverter connection having terminals for connection to a d.c. voltage source, with at least one inverter bridge, in which each valve branch consists of a thyristor and a diode connected in anti-parallel therewith, which thyristor and diode may be combined in a single component, the inverter bridge being connected between the terminals in series with a valve consisting of a second thyristor and a second diode connected in anti-parallel therewith, which second thyristor and second diode may also be combined in a single component, the inverter bridge being further connected to a turn-off circuit for turning off all the thyristors, which turn-off circuit comprises a capacitor connection and a turn-off thyristor means.

In an inverter bridge it is previously known to arrange a common turn-off circuit for turning off all the valves of the bridge simultaneously. For example, FIG. 9 in British Patent Specification No. 1,264,538 shows an example of an inverter connection of this previously known kind. This known connection, however, has considerable disadvantages.

For one thing, the prior art connection shows two thyristors (11, 8) which are connected in series with each other directly to the d.c. voltage source. If, through a malfunction, these two thyristors should become conducting at the same time, the d.c. voltage source would become short-circuited through the thyristors. This short-circuit path has no impedance elements whatsoever to limit the short-circuit current, and therefore there is a considerable risk that the thyristors will become destroyed in the case of a malfunction of the kind stated.

Secondly, in the prior art connection, the point of connection between the commutation thyristors 8 and 11 is at a potential which exceeds the supply voltage. The potential of the said point is dependent on the figure of merit of the turn-off circuit and on the "ignition" times of the thyristors, and is therefore insufficiently controlled and may assume high values. The thyristors 8 and 11 must therefore be dimensioned for high voltages, which involves an economical and practical disadvantage.

DISCLOSURE OF THE INVENTION

The purpose of the present invention is to provide an inverter connection of the kind described in the introduction, in which no additional short-circuit paths are formed by the turn-off circuit and in which the voltage across the turn-off thyristors is well-controlled and limited to a value which is below the voltage of the supply d.c. voltage source.

According to the present invention there is provided an inverter connection with terminals for connection to a d.c. voltage source, said inverter connection having at least one inverter bridge, in which each valve branch comprises a thyristor and a diode connected in anti-parallel therewith, the inverter bridge being connected between the terminals in series with a valve consisting of a second thyristor and a second diode connected in anti-parallel therewith, the inverter bridge being further connected to a turn-off circuit for turning off all the thyristors, said turn-off circuit comprising a capacitor connection and a turn-off thyristor means, wherein the turn-off thyristor means comprises a thyristor connection, controllable in both directions, connected in series with at least one capacitor between a point, which is located between the inverter bridge and the valve, and at least one of the terminals and wherein at least two of the three current paths extending between said point and the terminals, namely the current path including the inverter bridge, the current path including the valve and the current path including the turn-off thyristor means, include a turn-off inductor.

BRIEF DESCRIPTION OF DRAWINGS

The invention will now be described, by way of example, with reference to the accompanying drawings, in which.

DESCRIPTION OF PREFERRED EMBODIMENTS

Figure 1:
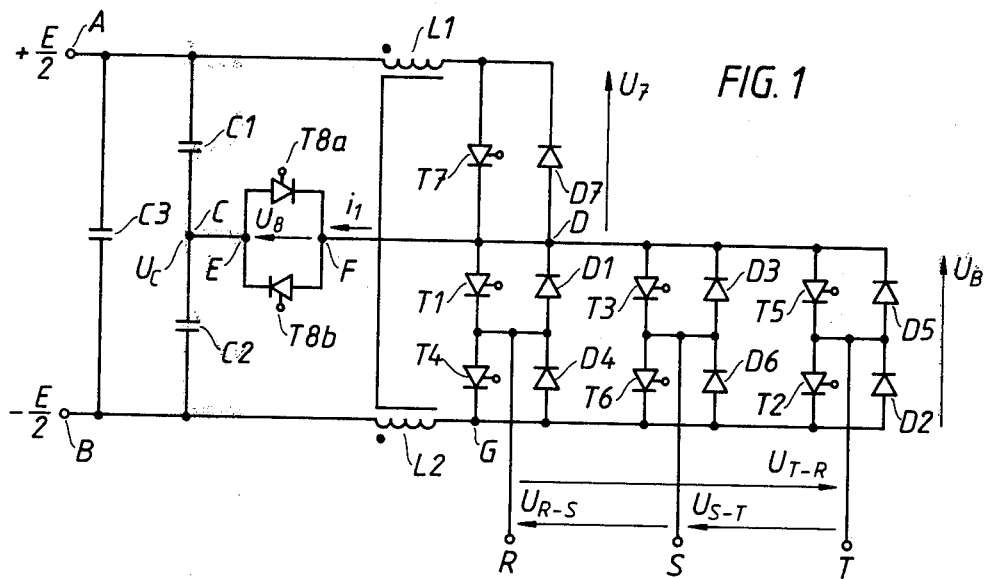
FIG. 1 is a circuit diagram of one embodiment of inverter connection according to the invention.

The inverter connection in FIG. 1 has two terminals A and B for connection to a supply d.c. voltage source. The source is assumed to have a d.c. voltage E and the terminal A is assumed to be at a potential $+E/2$ and the terminal B at a potential $-E/2$. Between the terminals A and B, a capacitor C3 is connected. This capacitor may be a large electrolytic capacitor for smoothing the d.c. voltage. If a smoothing capacitor is included in the d.c. voltage source, the capacitor C3 may be omitted from the inverter connection. The connection has a conventional three-phase inverter bridge with six thyristors T1-T6 and six diodes D1-D6, in which each valve branch consists of a thyristor which is anti-parallel-connected to a diode. The bridge has three a.c. connections R, S and T. The d.c. voltage across the bridge is designated $U_B$ and the three main voltages in the generated three-phase a.c. voltage are designated $U_{R-S}$, $U_{S-T}$ and $U_{T-R}$. The bridge is connected in series with a valve T7-D7 between the terminals A and B. The valve consists of a thyristor T7 anti-parallel-connected to a diode D7. The voltage across the valve is designated $U_7$. The point of connection between the valve and the bridge is designated D.

A turn-off circuit consisting of two series-connected turn-off capacitors C1 and C2 is connected between the terminals A and B, the point of connection between said turn-off capacitors being designated C. The potential at the point C is designated $U_C$. Connected between the points C and D is a turn-off thyristor connection which consists of two mutually anti-parallel-connected thyristors T8a and T8b. The current through this connection is designated $i_1$ and the voltage across it is designated $U_8$.

A first turn-off inductor L1 is arranged in series with the valve T7-D7, and a second turn-off inductor L2 is arranged in series with the inverter bridge. In the following description these inductors are assumed to be magnetically coupled to one another with a coefficient of inductive coupling which is equal to unity.

Figure 2:
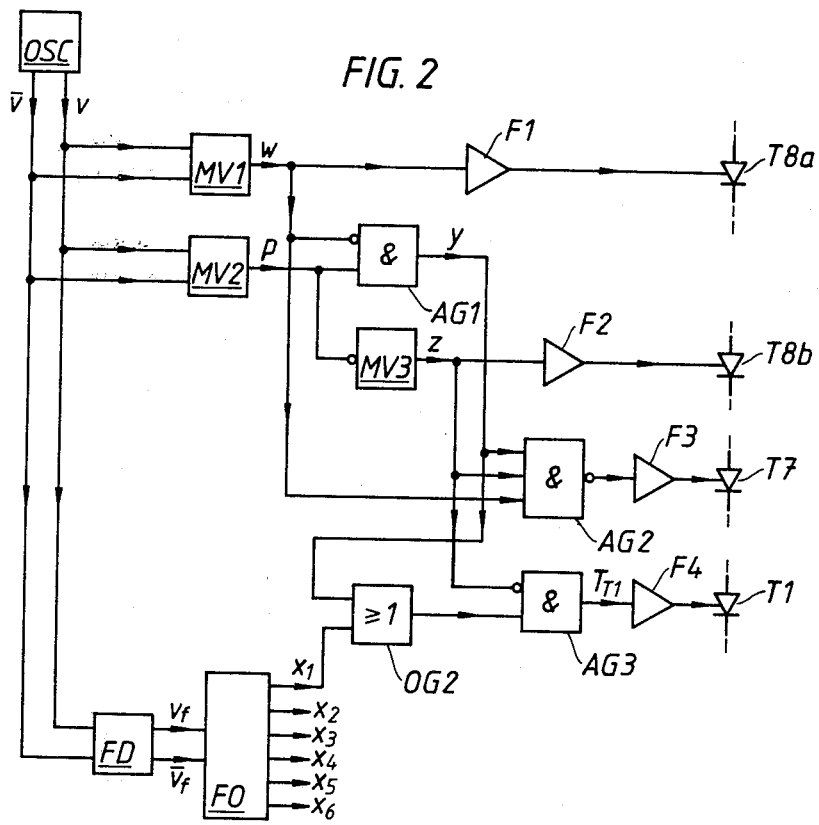
FIG. 2 is a block diagram of the control circuits used in the connection according to FIG. 1.

FIG. 2 shows an example of how the control circuits for the connection shown in FIG. 1 may be designed. An oscillator OSC emits square wave pulses v with a frequency which is three times as high as the frequency of the output voltage of the inverter bridge, that is, the period T (see FIG. 4) of the signal v is one-third of the period of the output voltage. The oscillator OSC also emits the inverted signal $\bar{v}$ of the signal v. The signals v and $\bar{v}$ are fed to a monostable flip-flop MV1 which emits a short pulse of duration $\tau$ on the arrival of the leading edge of one of the signals v and $\bar{v}$. The output pulse train w from the flip-flop MV1 is fed, via an amplifier F1, to the control electrode of the turn-off thyristor T8a.

The signals v and $\bar{v}$ are also fed to a second monostable flip-flop MV2 which emits a pulse of duration $T_1$ on the arrival of the leading edge of one of the signals v and $\bar{v}$. The output pulse train p from the flip-flop MV2 is fed to a third monostable flip-flop MV3 with an inverting input, which, on the arrival of the trailing edge of a pulse of the train p emits a pulse of duration $\tau$. The output pulse train z from the flip-flop MV3 is fed, via an amplifier F2, to the control electrode of the thyristor T8b to control the conduction periods of this thyristor.

The control pulses for the thyristor T7 are generated as follows. The pulse trains p and w are fed to an AND circuit AG1, the output pulse train y of which is determined from the logical condition.

$$y = p \cdot \bar{w}$$

The pulse trains z, y and w are fed to a NAND circuit AG2, the output signal of which (designated $T_{T7}$ in FIG. 4) is fed to the control electrode of the thyristor T7, via an amplifier F3.

Figure 4:
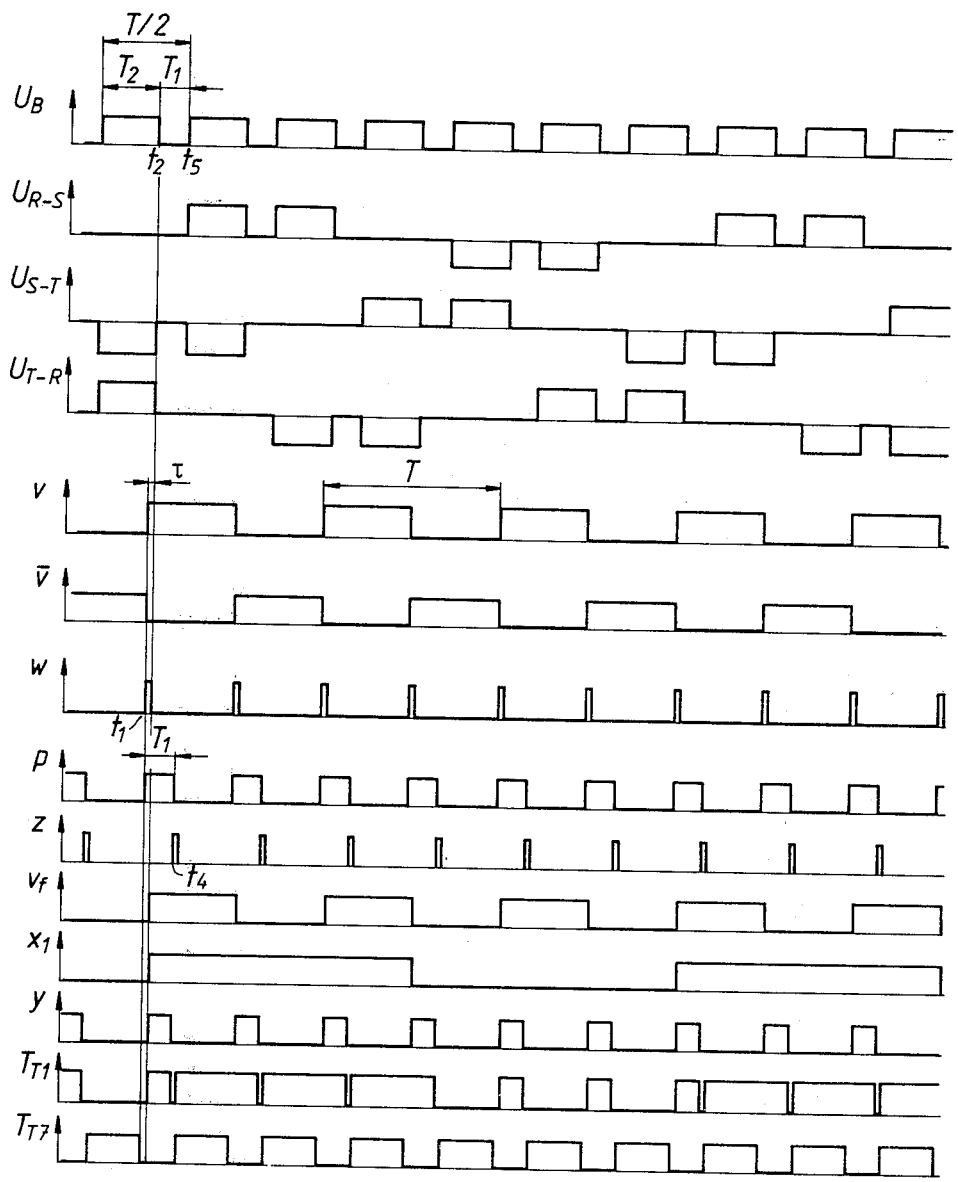
FIG. 4 shows some of the voltages and control signals occurring in the connection of FIGS. 1 and 2.

The signals v and $\bar{v}$ are also fed to a delay circuit FD, in which these signals are delayed by the time $\tau$. The output signals $v_f$ and $\bar{v}_f$ from the delay circuit are fed to a single-phase/six phase convertor F0 which emits six signals designated $x_1$-$x_6$. Each of these signals (only $x_1$ is shown in FIG. 4) consists of pulses of duration $3T/2$ and at a periodicity of $3T$. Referred to the output voltage of the inverter, the pulse length of the pulses $x_1$-$x_6$ is thus 180° and the six signals are successively displaced 60°.

The control signal $T_{Tn}$ for an arbitrary thyristor $T_n$ in the inverter is determined by the logical condition $$T_{Tn} = (x_n + y) \cdot \bar{z}$$

For thyristor T1, for example, the control signal $T_{T1}$ is formed by supplying signals $x_1$ and y to an OR circuit OG2. The output signal from this is supplied to an AND circuit AG3. Also signal z is supplied to an inverting input of said circuit AG3. The output signal of the circuit AG3 constitutes the control signal $T_{T1}$ for the thyristor T1 and is supplied to the control electrode of that thyristor via an amplifier F4.

For the other thyristors T2-T6 of the inverter, the control signals are formed in a corresponding manner.

The signals v, $\bar{v}$, w, p, z, $v_f$, $x_1$, y, $T_{T1}$ and $T_{T7}$ are shown in FIG. 4 together with the voltage $U_B$ across the inverter bridge and the three main voltages $U_{R-S}$, $U_{S-T}$ and $U_{T-R}$.

A commutating sequence will now be described in detail with reference to FIG. 3. At the top of this Figure, the turn-off capacitor voltage, i.e. potential $U_C$ at point C of FIG. 1, is shown. Below this are shown the current $i_1$ through the turn-off thyristors T8a and T8b; the voltage $U_8$ across these thyristors; the voltage $U_7$ across the valve T7-D7 and the voltage $U_B$ across the inverter bridge. The times marked in FIG. 3 correspond to the corresponding times shown in FIG. 4.

Before time $t_1$ the thyristor T7 is conducting, i.e. $U_B = E$. Further, the thyristors T4, T5 and T6 are conducting, i.e. $U_R = -E/2$, $U_S = -E/2$ and $U_T = +E/2$, which gives $U_{R-S} = 0$, $U_{S-T} = -E$ and $U_{T-R} = +E$. The potential $U_C$, at point C, lies at a value $E + \Delta$ which exceeds the source voltage E by an amount $\Delta$.

At $t = t_1$, $w = "1"$ and the turn-off thyristor T8a starts conducting. The thyristor T7 is turned off and the turn-off capacitors start an oscillation through the thyristor T8a, the diode D7 and the turn-off inductor L1. Prior to the turn-off, the potential $U_C$ exceeded the potential $E/2$ of the terminal A by the amount $E/2 + \Delta$ and, if the oscillation had been completed, after the oscillation it would have been below the potential of the terminal A by the same amount, i.e. it would have reached the potential $-\Delta$. When the potential $U_C$ passes through zero at $t = t_2 (t_2 = t_1 + \tau)$, however, the signal y in FIGS. 2 and 4 becomes "1", and therefore all the thyristors in the bridge T1-T6 start conducting. The diode D7 stops carrying current and the voltage across the valve T7-D7 becomes equal to the source voltage E. At the same time, the bridge voltage $u_B$ and all the main voltages drop to zero. The turn-off process now continues via the thyristor T8a, the thyristors of the inverter bridge and the inductor L2. When the process is completed, at $t = t_3$, $U_C = -(E + \Delta)$ and the thyristor T8a stops conducting.

At $t = t_4$ ($t_4 = t_1 + T_1$), $z = "1"$ and the thyristor T8b starts conducting. All the thyristors of the bridge are turned off and an oscillation, analogous to that described above, builds up via the inductor L2, the six diodes of the bridge, and the thyristor T8b. When $U_C$ at $t = t_5$ ($t_5 = t_4 + \tau$) passes through zero, $T_{T7} = "1"$ and the thyristor T7 starts conducting, the voltage $U_B$ thus increasing to the value E. At the same time, $z = 0$, the three thyristors in the bridge (in this case T1, T5, T6)—which are required to be conducting after the commutation—start conducting. At the time $t = t_6$, the turn-off sequence is completed, and the potential $U_C = E + \Delta$, and the thyristor T8b stops conducting.

In the foregoing, the mode of operation has been described in the ideal case (no load, no losses, complete coupling between the two turn-off inductors). The mode of operation in the real, non-idealized case is, however, in principle the same as that described above.

Figure 3:
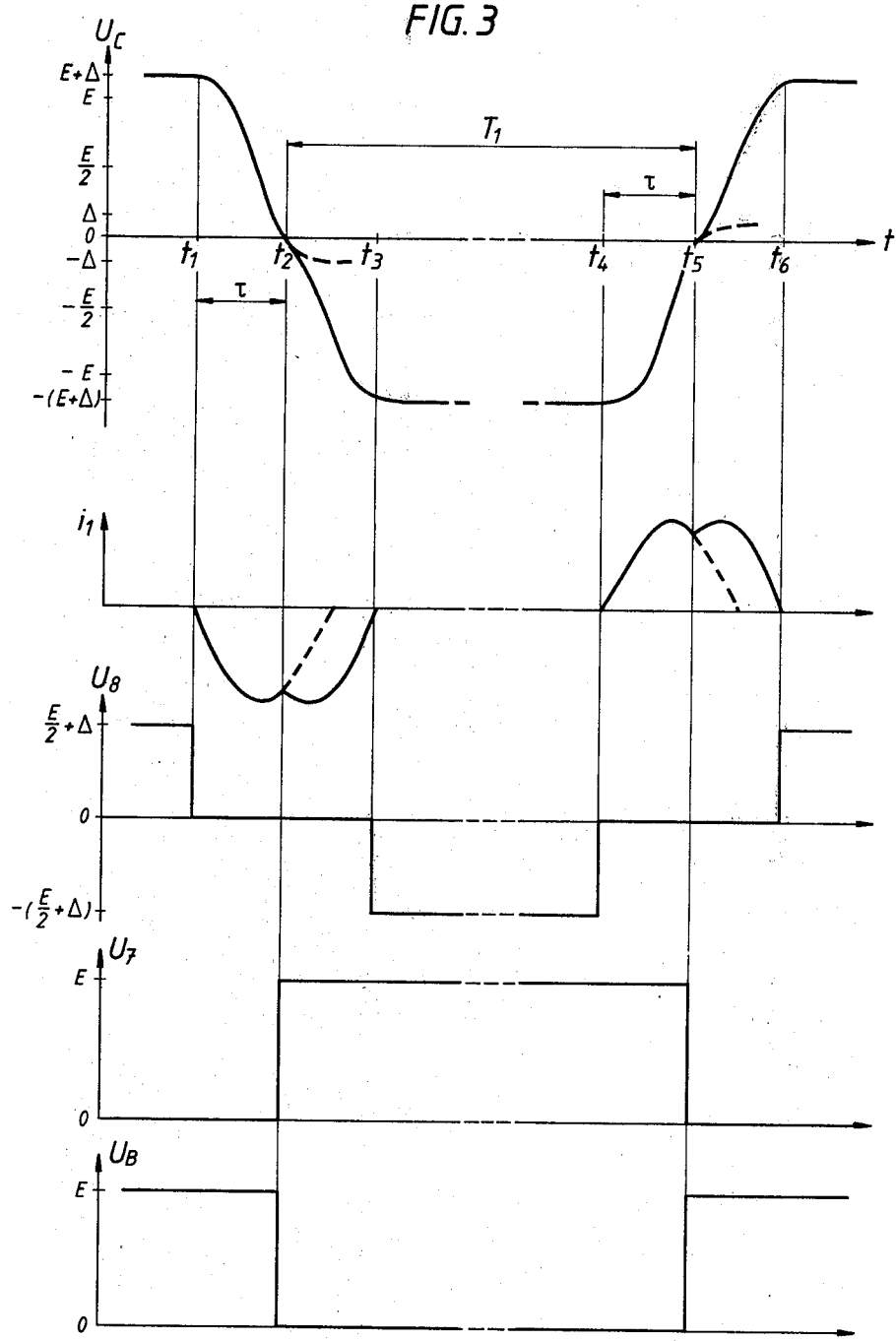
FIG. 3 is a graphic representation of two turn-off sequences obtained with the connection according to FIGS. 1 and 2.

As is clear from FIG. 3, the voltage $U_8$ across the turn-off thyristors is never higher than $E/2 + \Delta$, i.e. somewhat higher than half the source voltage ($\Delta$ is always smaller than $E/2$). This means a considerable advantage compared with the prior art connection discussed in the introduction.

The valve T7-D7, as well as each valve branch in the bridge, may alternatively consist of a so-called reverse conducting thyristor, i.e. a single component with the same properties as a thyristor and an anti-parallel-connected diode.

If desired, the control circuits may be simplified by supplying one and the same firing signal to both the turn-off thyristors each time that one of them is to conduct (only one thyristor at a time may become current-carrying).

The two coupled inductors L1 and L2 in FIG. 1 may be more or less rigidly coupled to each other, but alternatively they may be completely uncoupled.

The turn-off capacitors are discharged completely upon each turn-off operation and any surplus charge is fed back to the d.c. voltage source. Only the losses in the turn-off circuit need be covered from the d.c. voltage source.

The above description shows how all the inverter thyristors (at $t=t_2$) and the thyristor T7 (at $t=t_5$), respectively, are fired during the zero passage of the potential $U_C$. In practice, it may be advantageous to make these firings somewhat before the zero passage of the potential $U_C$.

As is clear from FIG. 4, an extinction of the thyristors of the inverter bridge takes place at each 60° of the a.c. voltage. This is a minimum and if desired, of course, further extinction may be made to influence the mean value and/or curve shape of the output voltage. Similarly, during the interval between two extinctions, the thyristors of the bridge may be fired in arbitrary combinations and at arbitrary times.

The frequency of the output voltage of the inverter is varied by varying the frequency of the oscillator OSC (i.e. varying the period T in FIG. 4). Similarly, the effective voltage may be varied by varying the length of the interval $T_1$ in relation to the period T.

The turn-off thyristor connection has been shown as two anti-parallel-connected thyristors (T8a, T8b) in FIG. 1. It may be replaced by any other thyristor connection which is controllable in both directions. For example, it may consist of two series-connected thyristors having opposite polarities, each thyristor then being parallel-connected with a diode with a conducting direction opposite to that of the respective thyristor.

The turn-off capacitor connection C1-C2 in FIG. 1 may be replaced with an arbitrary connection, by means of which the turn-off thyristors are a.c. connected to at least one of the terminals A and B.

Figure 6:
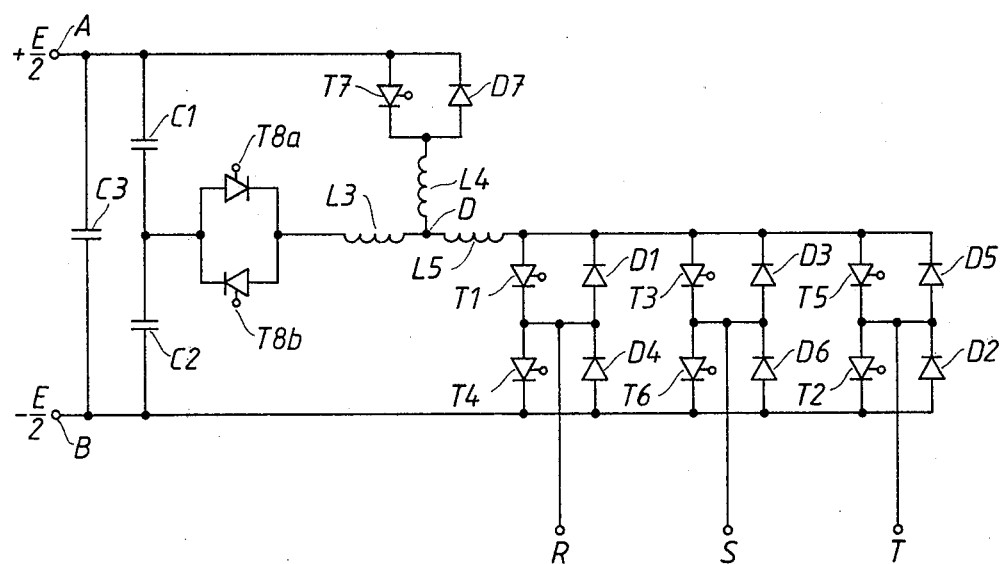
FIG. 6 is a circuit diagram of a third embodiment of inverter connection according to the invention.

Similarly, the inductors L1 and L2 may be located differently to what is shown in FIG. 1, for example in series with the capacitors C1 and C2. The only requirement is that they are arranged in such a manner that, during the turn-off process through the valve T7-D7 and the inverter bridge, respectively, they are traversed by the capacitor current. This means that inductors, as shown in FIG. 1, may be arranged in the two current paths from the point D (between the valve T7-D7 and the inverter bridge) to the terminals A and B which comprise the valve and the bridge, respectively. Alternatively, inductors, as shown in FIG. 6, may be arranged in all three current paths from the point D to the terminals, i.e. in series with valve T7-D7 (L4), in series with the bridge (L5), and in series with the turn-off thyristor connection (L3). To prevent the formation of a solid short-circuit path between the terminals via the valve T7-D7 and the bridge, at least one of the inductors L4 and L5 in FIG. 6 must be present. If only one of these inductors is present, it is necessary to arrange also an inductor in series with the turn-off thyristor connection (L3).

If desired, one or more additional inverter bridges may be a.c. parallel-connected with the bridge shown in FIG. 1. The d.c. connections of the additional bridges are then connected to the point D and a point G in FIG. 1, and the voltage $U_B$ is then applied to all the parallel-connected bridges. These bridges may be operated at the same or at different frequencies, and (if the frequencies are equal) in phase with each other or displaced in phase. On their a.c. sides the bridges may be parallel-connected (e.g. via transformers) or they may feed separate loads.

An advantageous embodiment is obtained if two three-phase bridges are connected in parallel and arranged to work at the same frequency but displaced in phase 30° with respect to each other. The extinctions of the bridges are then carried out at least each 30°. The output voltages of the bridges may be added vectorially by means of a transformer connection, and this makes it possible to eliminate all the harmonics up to the tenth harmonic in the resultant a.c. voltage, which gives the output voltage an extremely good curve shape.

Figure 5:
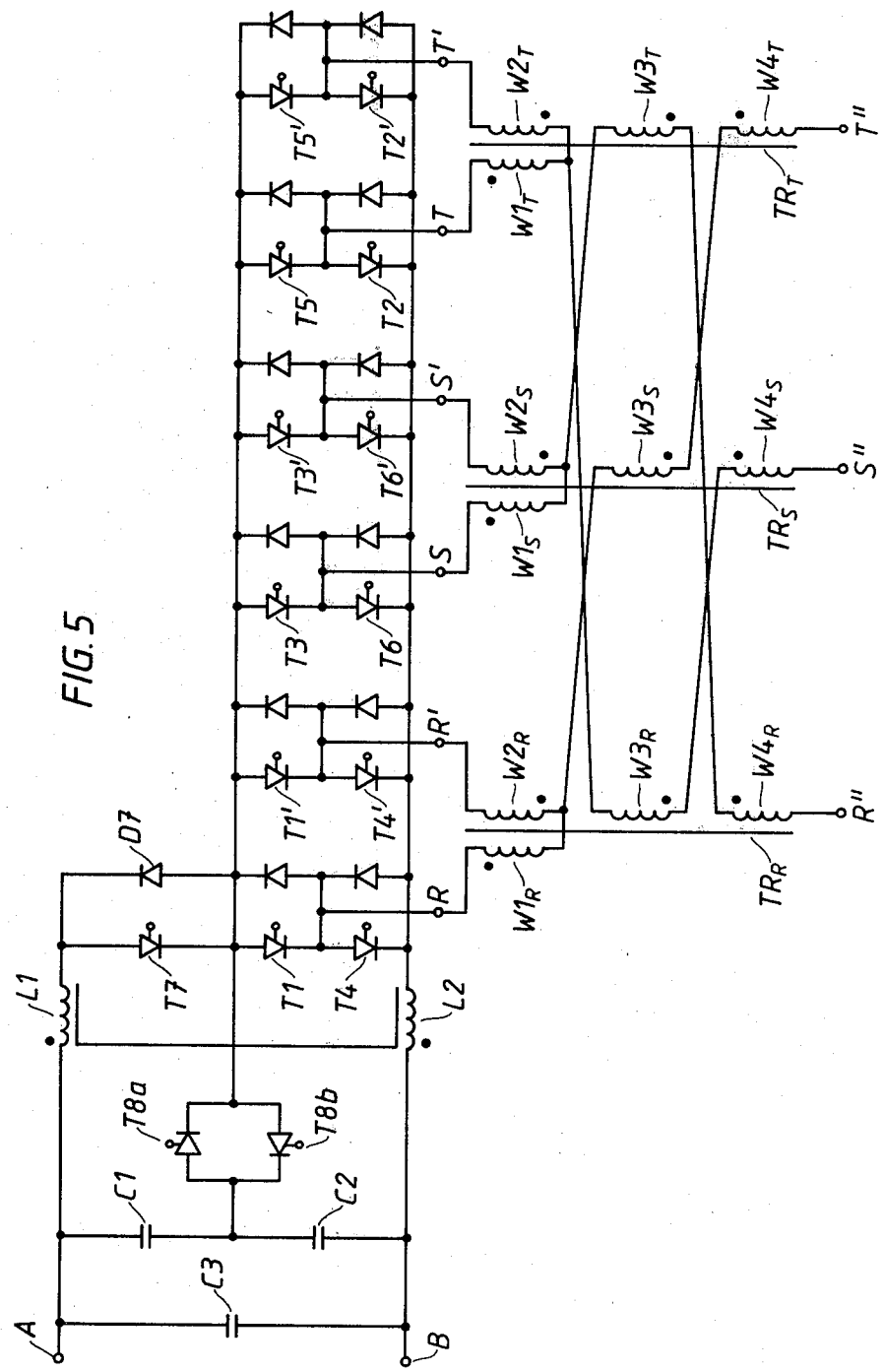
FIG. 5 is a circuit diagram of a second embodiment of inverter connection according to the invention with two inverter bridges.

A connection of the above-mentioned kind is shown in FIG. 5. If differs from the connection shown in FIG. 1 in that a second inverter bridge T1'-T6' has been connected in parallel with the inverter bridge T1-T6. The second inverter bridge is identical with the first bridge and works at the same frequency as the first. However, the two bridges work with a phase displacement of 30° with respect to each other. A commutation in one of the bridges therefore takes place each 30° of the a.c. voltage, and the turn-off circuit (C1, C2, T8a, T8b, L1, L2) which is common to the bridges is therefore arranged to turn off all the current-carrying thyristors in the two bridges each 30° in essentially the same manner as has been described in connection with FIGS. 1-4.

For combining the output voltages of the bridges, a transformer connection is arranged. It consists of three identical transformers $TR_R$, $TR_S$ and $TR_T$. Each transformer has four windings, for example windings $W1_R$, $W2_R$, $W3_R$ and $W4_R$ in the transformer $TR_R$. Two of the windings ($W1_R$, $W2_R$) have the same number of turns $N_1$ and are interconnected. The other two windings ($W3_R$, $W4_R$) have the number of turns $N_2$. The two interconnected windings (e.g. $W1_R$, $W2_R$) of each transformer are connected to the corresponding phase terminal (R and R', respectively) of the two bridges. The point of connection of the windings is connected to one of the three a.c. voltage terminals (T″) of the connection by way of a winding ($W3_S$) in one of the other two transformers ($TR_S$) and an oppositely directed winding ($W4_T$) in another ($TR_T$) of the other two transformers.

With a suitable choice of the ratio between $N_1$ and $N_2$, the fifth and seventh harmonics may be totally eliminated in the three main voltages which appear between the a.c. voltage terminals R″, S″, T″ of the connection.

FIG. 6 shows an alternative embodiment of the main circuit according to FIG. 1. The turn-off circuit consists of the thyristors T8a and T8b, the capacitors C1 and C2 and the inductor L3. The connection is controlled and operates in substantially the same way as has been described with reference to FIGS. 1-4. Two inductors L4 and L5 are connected between the point D and the valve T7-D7 and between the point D and the inverter bridge for limiting the rate of change of the current in the event of a commutation error.

Only three-phase inverter bridges have been illustrated and described in the foregoing description, but the bridges may, of course, have arbitrarily lower or higher phase numbers.

I claim:

1. An inverter connection with terminals for connection to a D.C. voltage source, said inverter connection having at least one inverter bridge, in which each valve branch comprises a thyristor and a diode connected in anti-parallel therewith, the inverter bridge being connected between the terminals in series with a valve consisting of a second thyristor and a second diode connected in anti-parallel therewith, the inverter bridge being further connected to a turn-off circuit for turning off all the thyristors, said turn-off circuit comprising a capacitor connection and a turn-off thyristor means, wherein the turn-off thyristor means comprises a thyristor connection, controllable in both directions, connected in series with at least one capacitor between a point which is located between the inverter bridge and the valve and at least one of the terminals, and in which two turn-off inductors are provided, one of which is connected in series with the valve and the other of which is connected in series with the inverter bridge.

2. An inverter connection according to claim 1, in which the capacitor connection comprises two capacitors connected in series with each other between the terminals, and the turn-off thyristor means is connected to a point between said capacitors.

3. An inverter connection according to claim 1, in which the turn-off inductors are magnetically coupled one to the other.

4. An inverter connection according to claim 1, in which a turn-off inductor is connected in series with the turn-off thyristor connection.

5. An inverter connection according to claim 1, in which two three-phase inverter bridges are provided and are connected in parallel with each other on their d.c. sides, said inverter bridges being arranged to operate at the same frequency but being displaced in phase one relative to the other, and means is provided at the outputs of said inverter bridges for vectorially adding the output voltages of the said inverter bridges, the turn-off circuit being arranged to turn off the thyristors of the bridges once every 30° of the a.c. output voltages of the bridges.

6. An inverter connection according to claim 1, in which the turn-off circuit comprises a series connection of an inductor, a capacitor and the turn-off thyristor connection, said series connection being connected between the said point and at least one of the terminals.

* * * * *